Patented May 7, 1946

2,399,829

UNITED STATES PATENT OFFICE 2,399,829

METALLIC GERMICIDAL SOLUTION AND METHOD OF MAKING SAME

Anthony J. Salle, West Los Angeles, and Howard L. Guest, Ocean Park, Calif., assignors of one-half to Leo A. Gunther, Robbins, Calif.

No Drawing. Application October 27, 1942, Serial No. 463,541

5 Claims. (Cl. 167—14)

This invention relates to metallic type germicidal solutions.

Heretofore, mercury compounds and solutions of metallic compounds of iodine in the oxidized form have been employed as germicides and antiseptics. Such mercury and iodine solutions, when applied to body tissue for killing micro-organisms such, for example, as Staphylococcus aureus, and must be used in concentrations that are destructive to such tissue if strong enough to be effective for killing the micro-organisms. The mercury solutions have been particularly destructive to tissue. Manifestly, the cost of the solutions is dependent upon the concentration; hence, a stronger concentration is more costly than a weaker one, but heretofore dilution of a solution to the point where its causticity to tissue is substantially non-existent has resulted in a corresponding decrease in its germicidal properties.

By this invention such germicidal solutions as above mentioned may be diluted to a point where it is substantially non-caustic to body tissue while retaining the desired germicidal properties. Also, by this invention, an effective, stainless germicide is produced from stannic chloride in a solution that is non-caustic to tissue.

Objects of this invention are the production of germicidal solutions from metallic compounds in an oxidized form that have heretofore been objectionably irritating, and caustic to body tissue, and also a more economic germicide without loss in killing power as compared with standard solutions.

Another object is the economic production of stainless metal germicides.

In the following description comparisons in killing power or killing time will have particular reference to the application of germicides to Staphylococcus aureus, since this is commonly used for tests, and most prevalent in wounds.

Briefly described, to each one gram molecular weight of the mercury compound, tin compound or metallic compound of iodine in the oxidized form, such as mercuric chloride, stannic chloride, or any metallic compound of iodine, we add one equivalent weight of a reducing agent such as ferrous sulphate, ferrous chloride, stannous chloride, manganous chloride, or manganous sulphate. Any reducing agent which is soluble in the end product, and which will not precipitate or be precipitated by the compound, is suitable.

Before the addition of a reducing agent, such as one of the above, the least lethal dilution of mercuric chloride in ten minutes, to Staphylococcus aureus, is 1:16000 and its effective germicidal concentration is 1:3000 but the destructive effect of such a solution to body tissue is objectionable; however, by the addition of the reducing agent as described, the least lethal dilution becomes 1:40000 and the effective germicidal dilution 1:8000 which is considerably less toxic to tissue than the greater concentration of the former.

Before the addition of the reducing agent to stannic chloride, the least lethal dilution is 1:50 and an effective dilution would be 1:10, which dilution is very irritating and objectionably destructive to tissue; however, by adding the reducing agent, the least lethal dilution is 1:150 and the effective dilution is 1:50 which is correspondingly less irritating.

The metallic compound of iodine with the addition of the reducing agent has its killing power proportionally increased about three times, thus enabling its dilution to the point where it is less destructive to tissue, but is still as germicidal as the greater and more caustic concentration before the addition of the reducing agent and water.

In view of the cheapness of the reducing agents used and the increased effectiveness of the solutions as germicides, it is seen that the higher dilutions to obtain the equivalent killing power of the prior caustic solutions results in a much cheaper product, and the mercury salts in general are stainless as also are the tin salts.

Having described our invention, we claim:

1. The method of increasing the germicidal property of a solution of one of the group consisting of mercuric chloride and stannic chloride, that comprises the step of adding to each gram molecular weight of such metallic compound an equivalent weight of a reducing agent from the group consisting of ferrous sulphate, ferrous chloride, stannous chloride, manganous chloride and manganous sulfate.

2. A germicidal product for use in a solution that comprises a metallic compound from the group consisting of mercuric chloride and stannic chloride, to each molecular weight of which is added an equivalent weight of a reducing agent from the group consisting of ferrous sulfate, ferrous chloride, stannous chloride, manganous chloride and manganous sulfate.

3. A germicidal aqueous solution containing one of the group consisting of mercuric chloride and stannic chloride, and a reducing agent from the group consisting of ferrous sulfate, ferrous chloride, stannous chloride, manganous chloride, and manganous sulfate, in the proportion of a gram molecular weight of the reducing agent to each gram molecular weight of the metallic compound.

4. A substantially stainless germicidal solution containing one of the group consisting of mercuric chloride and stannic chloride and an equivalent weight of stannous chloride to each gram molecular weight of the mercuric chloride or stannic chloride.

5. A solution having a germicidal property, when applied to *Staphylococcus aureus*, substantially equal to a 1:50 solution of stannic chloride that comprises substantially 1:150 solution of stannic chloride and a reducing agent from the group consisting of ferrous sulfate, ferrous chloride, stannous chloride, manganous chloride and manganous sulfate, the amount of said reducing agent in said solution being one gram molecular weight for each gram molecular weight of the mercuric chloride.

ANTHONY J. SALLE.
HOWARD L. GUEST.